United States Patent [19]
Georges et al.

[11] Patent Number: 5,892,537
[45] Date of Patent: Apr. 6, 1999

[54] AUDIO-VISUAL TELECOMMUNICATIONS UNIT DESIGNED TO FORM A VIDEOPHONE TERMINAL

[75] Inventors: Buchner Georges; Therese Morin, both of Paris; Alain Isckia, Vitry Surseine, all of France

[73] Assignee: France Telecom, France

[21] Appl. No.: 780,343

[22] Filed: Jan. 8, 1997

[30] Foreign Application Priority Data

Jan. 16, 1996 [FR] France .................................. 96 00633

[51] Int. Cl.$^6$ ............................. H04N 7/12; H04M 11/00
[52] U.S. Cl. ..................... 348/14; 379/93.06; 379/110.01
[58] Field of Search ..................... 348/14–20; 379/93.05, 379/93.06, 93.08, 93.09, 93.17, 93.28, 93.37, 110.01, 90.01

[56] References Cited

U.S. PATENT DOCUMENTS

| | | | |
|---|---|---|---|
| 5,541,982 | 7/1996 | Bergler | 348/14 |
| 5,675,375 | 10/1997 | Riffee | 348/15 |

FOREIGN PATENT DOCUMENTS 0 585 805   3/1994   European Pat. Off. .

*Primary Examiner*—Wing F. Chan
*Attorney, Agent, or Firm*—Laff, Whitesel, Conte & Saret, Ltd.

[57] ABSTRACT

An audio-visual telecommunications system comprises a videophone terminal including a videophone communication interface for making a connection to a telecommunications network. A picture processing unit receives audio-visual signals from the videophone terminal which it process in order to compose a picture with sound. The picture processing unit transmits signals representing the composite picture to a television set. The picture processing unit includes an image memory which stores visual signals in a digital form as they are received from the videophone communication interface. A time base receives a composite video signal from the television set and extracts the line and frame synchronized signals. The time base controls a readout which is synchronized with the extracted synchronization signals and formed responsive to the signals stored in the memory.

14 Claims, 1 Drawing Sheet

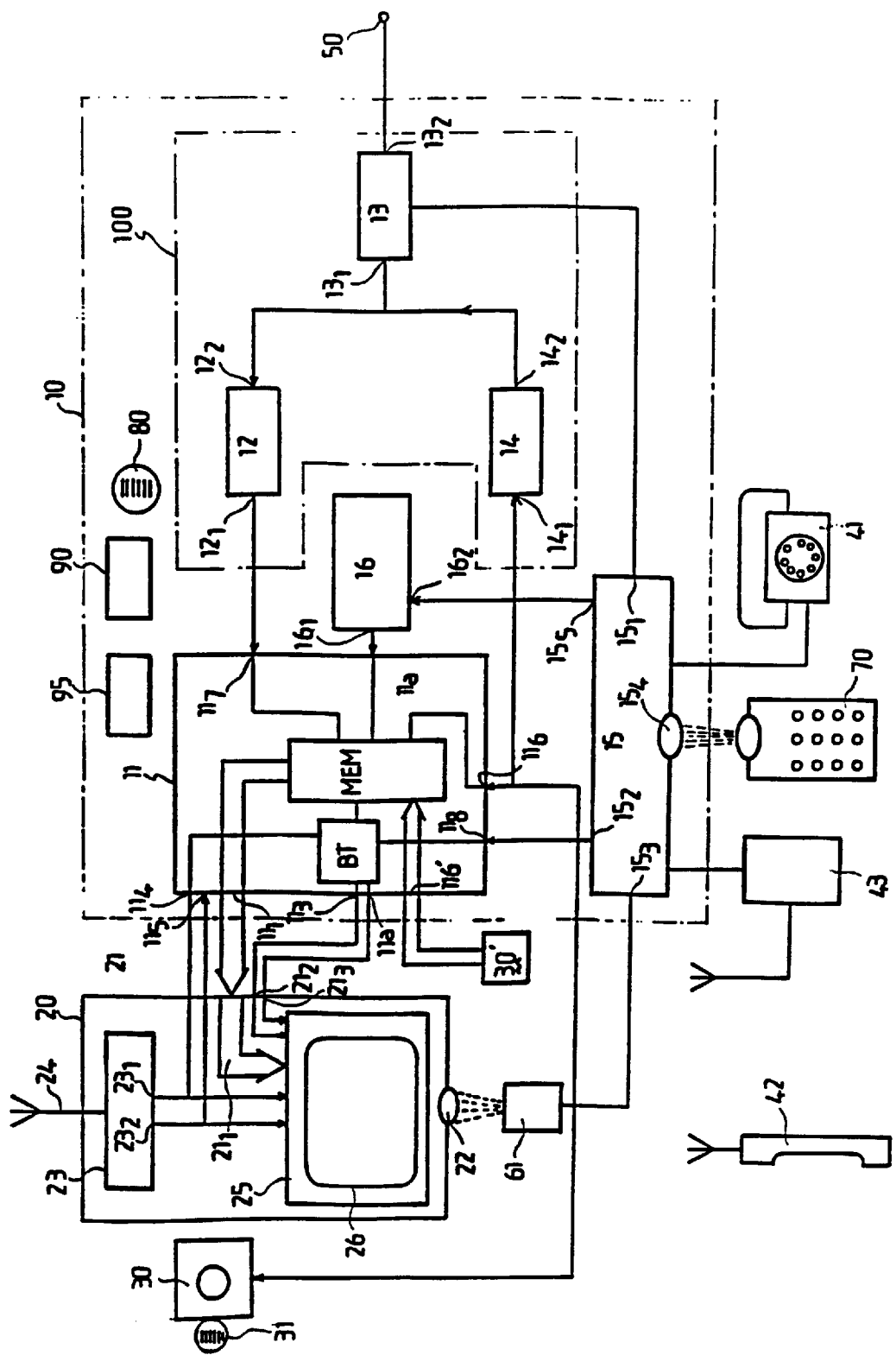

AUDIO-VISUAL TELECOMMUNICATIONS UNIT DESIGNED TO FORM A VIDEOPHONE TERMINAL

The invention concerns an audio-visual telecommunications unit designed to form a videophone terminal. This type of equipment is generally used in a videophone or videoconferencing system.

BACKGROUND

It will be noted that, in the remainder of the description, the term videophone system will be used to mean both a conventional videophone system in which two terminals may exchange audio-visual data and a videoconferencing system where more than two terminals are involved in a call.

Videophone systems are already known, for example that described in patent document FR-A-2 673 060. This type of system generally consists of a terminal equipped with a communications interface linked to a telephone or other line, a camera and a restoration unit with a screen on which the image of the speaker positioned in front of the camera and the remote speaker can be displayed.

One of the present curbs on the important development of videophone systems is the cost of the terminal which is exacerbated primarily by the price of the restoration unit, which is generally equipped with a liquid crystal display screen.

However, most homes are equipped with a television receiver that is generally colour. This type of equipment has become commonplace and is a standard consumer item sold at a relatively affordable price. Some homes even have several television receivers for convenience.

It is found nowadays that watching television programmes, either by cable or radio, private or public, is not the only focus of interest of this equipment and other uses have been developed and will continue to do so. In fact, with the TV peripheral unit socket, the television screen can be used to display pictures from different sources, such as video recorders, optical video disc readers, portable video cameras, such as the Caméscope®. In this respect, one can also include the use by the young (and not so young as well) of interactive video games.

The television receiver is thus becoming a tool that is used as a monitor with a screen and loudspeaker, independently of its VHF or UHF modulator and is thus put to a different use from that for which it was designed.

It is based on these facts that the applicant has developed an audio-visual telecommunications unit enabling use of a television set display screen. The great majority of homes now own such a system, and the cost of the display screen thus becomes marginal in the cost of the videophone system.

It will be noted that, in this description, the audio-visual telecommunications equipment involved operates in real time.

The purpose of the invention is thus to provide such an audio-visual telecommunications unit that operates in real time and is structured in such a way that, firstly, all the functions available on the videophone system are accessible by the remote control generally provided with television sets or by means of the control component of the telephone module of the videophone system, such as the keypad of a telephone handset, for example, and, secondly, these functions are displayed on screen without disrupting normal operation of the set.

An audio-visual telecommunications unit is also known, in particular from patent document JP-A-4 236 472, of a type comprising a videophone terminal designed for connection to a telecommunication network, an image processing unit, also termed an output controller, designed firstly to receive audio-visual signals emitted by the said videophone terminal and, secondly, to process the said signals in order to be able to compose a picture with sounds, in accordance with various proposed methods and to transmit signals representing the said composite picture to the restoration unit on a television set.

SUMMARY OF INVENTION

In this system, the television set is of a type enabling the superimposition of images in order to be able to compose a composite picture from the two images, one from an external source to the receiver, the other from the set itself, for display on a screen.

The purpose of the invention is to provide a unit of the type described in the abovementioned patent document which will enable the use of a television set on which the superimposition function is not provided. In particular, it is intended to provide an audio-visual telecommunications unit designed to form a videophone terminal equipped with a means of achieving this aim.

To do this, the said picture system of a unit as per the invention comprises, on the one hand, an image memory for storing, in digital form, visual signals received from a videophone communications interface of the said unit, and on the other hand a time base designed to receive the composite video signal, modulated or otherwise, from the television set and extract the line and frame synchronisation signals from this, the said time base controlling read-out, synchronised with the synchronization signals, of the said memory and slow or fast change-over of the television set to form the composite picture on the screen of the said set.

The broadcast television signal transmitted by the television set is either the demodulated composite videofrequency signal or the modulated composite videofrequency signal, either UHF or VHF, transmitted or present in the said television set.

According to one characteristic of the invention, the picture processing unit is designed to receive and process audio-visual signals from at least one external video source, such as a camera, which may be portable.

According to another characteristic of the invention, it comprises a graphics assembly consisting of a character and/or icon generator and a graphics interface module, designed to transmit, at the command of the said control unit, text, icon and/or graphics signals to the said picture unit, the latter using these signals to compose the said picture which is transmitted to the restoration unit of the television set.

According to another characteristic of the invention, it comprises a control unit designed to receive control signals transmitted by a remote control and, when a button or combination of buttons is pressed on the said remote control, to transmit control signals firstly via a wireless link to the said television said and secondly to the said picture unit and videophone system.

According to another characteristic of the invention, the said wireless link is the standard remote control link of the television set itself, this unit handling conversion of the protocol of the said remote control to the protocol of the said wireless link.

According to another characteristic of the invention, a telephone handset is linked to the said control unit, this control unit then being designed such that when a button or combination of buttons is pressed on the said handset, it is possible to operate the television set, the picture unit or the videophone system. This telephone handset may be a wireless handset.

Similarly, the said external audio-visual source is a portable camera, such as that used on a Camescope®.

According to another characteristic of the invention, it comprises a voice generator.

According to another characteristic of the invention, it comprises a voice recognition system enabling the user to operate the control unit by voice commands.

According to another characteristic of the invention, it is mounted within the television set itself.

BRIEF DESCRIPTION OF THE DRAWING

The characteristics of the invention mentioned above, and others, will be more clearly evident from reading the description below of an example of construction in conjunction with the attached drawing in which the single FIGURE is a block diagram of an audio-visual telecommunications unit as per the invention.

DETAILED DESCRIPTION OF THE INVENTION

This single FIGURE shows an audio-visual telecommunications unit 10 as per the invention, which is designed to form a videophone terminal. It is linked to a television set 20 by means of its TV peripheral unit socket 21, and also to an external audio-visual source, such as a television camera 30 which may, for example, consist of the camera on a portable video camera, such as a Caméscope®. The camera 30 can advantageously be equipped with a microphone 31. It is also linked to a telephone handset which may either be a fixed handset 41, in which case it is connected by a lead, or a wireless handset 42, in which case it has a base 43 with its antenna.

It is further linked to an infrared transmitter 61 which is designed to transmit control messages by infra-red radiation to an infrared sensor 22 on the television set 20. These control messages are for example intended to control channel changes, regulate sound level, picture contrast or colour brightness on the television set 20.

The telecommunications unit 10 is likewise designed, as will be seen from the remainder of the description, to receive control messages from a remote control 70. This remote control 70 may be the standard remote control normally provided with the television set 20, in which case the messages it transmits may control the functions of the set 20 directly, when received by the sensor 22. It may, however, be of a different type and in this case, the unit 10 handles the requisite conversions for control, via the infra-red transmitter 61, of the various functions of the television set 20.

Conventionally, the television set 20 consists of an actual reception part 23 connected to an appropriate antenna 24, which receives and demodulates the UHF or VHF remote broadcast television signals, and transmits a demodulated composite video signal and a demodulated audio signal on outputs $23_1$ and $23_2$ respectively. The latter signals are transmitted to a restoration unit 25 which is generally but not necessarily equipped with a cathode tube screen 26.

The TV peripheral unit socket 21 outputs the demodulated composite video signal and the likewise demodulated audio signal. It is equipped with an input bus $21_1$ to receive primary colour signals known as RGB signals and two inputs $21_2$ and $21_3$ for input of slow and fast switching signals respectively. The switching signals and RGB signals are transmitted to the corresponding inputs on the restoration unit 25. The slow switching signals enable change-over of a picture frame whilst the fast switching signals enable switching of a picture pixel.

The unit 10 comprises a picture unit 11 equipped with an output $11_1$ for transmission, via the TV peripheral unit socket 21, of RGB type picture signals to the television set 20 and outputs $11_2$ and $11_3$ to transmit the slow and fast switching signals respectively to the television set 20, likewise via the TV peripheral unit socket 21.

The picture unit 11 further has an input $11_4$ to which the television set 20 transmits, via the TV peripheral unit socket 21, a demodulated composite video signal, for example in SECAM, PAL or NSTC format, depending on the receiver used. This composite video signal consists of line synchronization and frame synchronization signals, in addition to brightness and colour information signals. It also comprises an input $11_5$ to which the television set 20 transmits, again via the TV peripheral unit socket 21, an audio signal, which may be stereo or otherwise, or high fidelity or otherwise.

The picture unit 11 is further equipped with an input $11_6$ to which the composite video output or RGB colour signals from the external audio-visual source 30 are directly connected.

It will be noted that the picture unit 11 may comprise several inputs for receiving composite video signals and/or RGB signals, such as input $11_6^1$, to which a source $30^1$, such as a video recorder, is connected by means of a bus that can carry RGB signals.

The telecommunications unit 10 is connected to at least one telecommunications support network 50 which may be a switched telephone network, an ATM network, an ISDN integrated services digital network, RLE corporate local area network, a network running the TCP/IP protocol, etc.

To this effect it comprises a decoder 14 which transmits audio-visual signals to its output $12_1$, these signals being transmitted to an input $11_7$ on the picture unit 11. The input $12_2$ of the decoder 12 is linked to the input/output $13_1$ of an adapter interface 13, whose input $13_2$ is linked to the telecommunications line 50. The decoder 12 decodes digital picture signals from the interface 13 and supplies them in a format compatible with the picture unit 11.

The telecommunications unit 10 also comprises a coder 14 whose input $14_1$ receives picture signals from the camera 30 and whose output $14_2$ transmits signals to the input/output $13_1$ of the interface 13. The coder 14 codes signals from the camera 30 and transmits them in a format compatible with the telecommunications network 50.

The decoder 12 and coder 14 and the interface 13 together form an element 100 which in this sector of technology is termed a videophone communications interface. It will be noted that the videophone interface used (decoder 12/coder 14/interface 13) is designed, depending on the type of network it accesses, to comply with ITU standards H.320 or H.324 or many other standards. It will also be noted that this videophone interface 100 may be located outside the telecommunications unit 10 box.

The telecommunications unit 10 also comprises a control unit 15, which has an input/output $15_1$ connected by a bidirectional link to a control input/output $13_3$ of the interface 13, with a second output $15_2$ connected to an input $11_6$ of the picture unit 11 and a third output $15_3$ connected to an infra-red transmitter 61. The control unit 15 includes an infra-red receiver $15_4$ designed to receive optical infra-red signals transmitted by a remote control 70.

The telecommunications unit 10 also comprises an assembly 16 consisting of a character and icon generator in combination with a graphics interface module, which has an output $16_1$ linked to an input $11_9$ of the picture unit 11 and a control input $16_2$ connected to an output $15_5$ on the control unit 15.

An icon here is deemed to mean any iconography which includes dialogue bars, icons per se, dialogue boxes, "buttons", etc. As will be seen below, this iconography provides help in dialogue/control/operation in a single consistent format to ensure user comprehension. This dialogue is displayed in an appropriate form on the television set 20 by superimposing the icons in the picture displayed on the television set 20.

In the form of construction described, the picture unit 11 consists of a time base TB and a picture memory MEM. The time base TB receives the demodulated composite video signal present on the input $11_4$, from which it extracts the line and frame synchronization signals of the picture displayed on the screen of the television set 20. The time bus is linked to the MEM memory to supply read/write signals, in synchronisation with the line and frame synchronisation signals. The MEM memory is designed to store visual transmitted from the decoder 12, character and icon generator 16 and camera 30, respectively. It is also designed to transmit visual signals stored on the output $11_1$ to enable display of the corresponding pictures on the screen of the television set 20. The time base is likewise linked to outputs $11_2$ and $11_3$ to change over between the display on the screen of the television set 20 of picture signals transmitted within the set itself and the display of picture signals transmitted from the MEM memory.

It is thus possible to superimpose, in the picture normally displayed on the screen of the set (30), such as a broadcast picture, either the picture transmitted by the decoder 12, or the camera 30, or the generator 16, or several of these pictures. It is likewise possible to display the picture from the camera 30 which contains a superimposition either of be picture transmitted from the decoder 12, or the picture transmitted by the generator 16, or the two together.

The unit 10 also comprises a sound and voice message generator 90 which is designed to transmit these messages, operated by control unit 15, to the television set 20.

It also comprises a voice recognition system 95 which recognizes the voice control messages of the user and operates the unit 10, especially the control unit 15, accordingly.

Operation of the audio-visual telecommunications unit in the invention is as follows.

Let us first consider the case of an external call.

Call signals received on the line 50 are transmitted to the input/output $15_1$ of the control unit 15. Either automatically after reception of a number of call signals, or by transmission of an infra-red signal via the remote control 70 received by the receiver $15_4$ of the control unit 15, the unit 15 operates the interface 13 to establish the connection.

The audio-visual signals on the line 50 are then transmitted to the decoder 12 which supplies the audio-visual in the required format to the input $11_7$ of the unit 11. These visual signals represent, for example, the face of the remote speaker whereas the audio signals represent that speaker's voice.

The control unit 15 also controls the picture unit 11 to operate the display of pictures transmitted by the decoder 12 and the camera 30 on the screen of the television set 20, either, as we have seen above, by superimposition in the broadcast pictures, or in the case of pictures from decoder 12 by superimposition in the picture transmitted by the camera 30.

The unit 15 likewise controls the generator 16 in such a way as to transmit to the picture unit 11 an information picture presented either in the form of text or in the form of an icon, giving the user information on the call in hand, functions accessible at that point, etc.

It will be noted that it would be possible for the incoming call information to be indicated simultaneously in three ways or separately: display of a service message on the screen of the television set 20, issue of a voice message, ringing on the telephone handset 41 or 42. The user will thus be warned of the type of telephone or videophone call.

It will be noted that the call can be limited to the audio channel only.

Let us now consider the case of a user making an outgoing call.

By pressing the buttons on the remote control 70, the caller transmits a control message to the unit 15, and this has the effect of controlling the interface 13 so that dialling can be undertaken and the call established. The unit 15 also controls the generator 16 and the unit 11 so that texts and/or icons used to follow the procedure can be displayed on the screen of the set 20.

This call procedure can likewise be handled with the telephone handset 41 or set 42.

As soon as the call is answered, service messages will appear either on the screen of the television set 20, or in the form of voice messages transmitted by the generator 90 to guide the user unit the call is completed.

After dialling the required telephone number, all the tones used for telephony will be restored to enable the user to monitor progress of the call, these tone signals or messages being specific to the region or country concerned.

Once the call has been established, visual signals from the camera 30 are transmitted to the coder 14 the via the interface 13 to the network 50. As before, the control unit 15 operates the picture unit 11 to control the display of pictures from the decoder 12 and the camera 30 on the screen of the television set 20, either, as we have seen before, by superimposition in the broadcast pictures, or in the case of pictures from the decoder 12 by superimposition in the picture from the camera 30.

Outside or during calls, the transmitter 61 is controlled by the unit 15 in such a way as to retranscribe signals received by the sensor $15_4$ of the remote control 70 concerning control of the television set 20. If required, several transmitters 61 can be provided so that each is located in front of a different unit, such as a video recorder, Caméscope, etc. In this case, the control unit 15 handles any control protocol conversions.

It will be noted that the controls handled by the remote control 70 may likewise be handled by the handset 41 or handset 42, provided that appropriate conversion is made in the control unit 15 or appropriate modification made to the base 43. To this effect, the control unit 15 assigns each button on the numeric keypad of one or other handset, as the dialogue progresses, to a television function or a function of the videophone interface 100. Hence, from the telephone set 41 or 42, the user can access certain functions on the television set, such as changing channels, adjusting contrast, brightness, etc.

Throughout all the procedures, the dialogue between the telecommunications unit 10 and the user is displayed on the screen of the television set 20. The remote control 70 is used, or one of the handsets 41 or 42 whose buttons can be reconfigured by programming or by assigning certain buttons to different actions.

The sound from the decoder 12 is retransmitted directly to the television set 20. As regards sound from the user, this can be picked up either by the microphone 31 on the camera 30 or by the microphone on one of the two handsets 41 or 42, or again by a microphone 80 on the telecommunications unit 10. Like the sound from the decoder 12, this sound is transmitted directly to the television set 20.

As we have seen, the remote control 70 enables access to the functions of the television set and to the videophone functions of the videophone interface 100. These include the various options currently provided on videophone terminals:

Transition between hands-free and handset mode

Regulation of sound levels in hands-free mode

Sound and visual secrecy

Video control

Remote pick-up for remote monitoring applications

Remote control of modules located on the remote videophone, for example centering of the camera, etc.

The telecommunications unit as per the invention may be equipped with a means of measuring light levels and, if this level is insufficient, it may activate top-up lighting to re-establish this at a predetermined acceptable level. This level may likewise be adjusted using the remote control 70.

It will be noted that depending on the form of construction covered by this invention, the telecommunications unit described above may be located inside the television set 20 box and it has only been presented and described as separate from the set 20 for the purposes of illustration.

Similarly, in the form of construction described, the telecommunications unit 10 is linked to the TV peripheral unit socket 21 of the set 20. It is understood that the picture unit 11 may also receive the same signals without using the intermediary of the TV peripheral unit socket.

In addition, according to an alternative form of construction, the picture unit 11 receives modulated UHF and VHF television signals transmitted or present in the television set 20, demodulates them and processes them to extract the synchronization signals which are then transmitted to the time base TB.

We claim:

1. An audio-visual telecommunication videophone system comprising a television set (20), a videophone terminal (10) having a communication interface means (100) for making a connection with a telecommunication network (50), picture processing means (11) responsive to signals received from said videophone terminal (10) for processing audio-visual signals into a composite visual and sound signal associated with a picture, said picture processing means (11) transmitting said composite signal to said television set (20), said picture processing means (11) further comprising an image memory (MEM) for storing said visual signals in a digital form as they are received from said interface means (100), time base means (TB) for extracting line and frame synchronizing signals responsive to said video signals received from said television set (20), and means responsive to said time base means (TB) for reading out said signals stored in said memory (MEM), said readout being synchronized by said extracted line and frame synchronized signals to form a picture on said television set (20) responsive to said composite signals.

2. The system of claim 1, further comprising means for receiving and applying a broadcast video frequency television signal to said television set (20), and means for displaying an image responsive to a demodulation of said video frequency signal.

3. The system of claim 2 wherein said broadcast video frequency television signals is in a frequency band selected from a group consisting of VHF and VHF.

4. The system of claim 1 further comprising external means for sending audio-visual signals to said picture processing means (11).

5. The system of claim 4 wherein said external means is a video camera (30).

6. The system of claim 5 wherein said video camera is portable.

7. The system of claim 1 further comprising graphics assembly means (16) including a character/icon generator, and control means (15) for commanding a transmission of said character/icon to said picture processing means (11) for composing said composite signal.

8. The system of claim 1, further comprising a remote controller (70) for sending wireless signals via links (61, 22), a control unit (15) operated by signals from said controller (70), and means for also controlling said control unit 15 responsive to signals from said picture processing means (11) and from said interface means (100).

9. The system of claim 8 wherein said remote controller (70) sends signals according to its protocol, and means in said control unit (15) for converting the protocol of said remote controller (70) to a protocol of said wireless links (61, 23).

10. The system of claim 8 further comprising a telephone handset (41, 42, 43) linked to said control unit (15), said telephone handset having means for transmitting control signals, and means responsive to an operation of said means for transmitting control signals for operating said television set (20), said picture processing means (11), and said videophone terminal (10).

11. The system of claim 10 wherein said handset (42) is a wireless handset.

12. The system of claim 1, further comprising a voice generator (90).

13. The system of claim 1, further comprising control means (15) for controlling said system, a voice recognition means (95), and means for operating said control means (15) responsive to said voice recognition means (95).

14. The system of claim 1 wherein said videophone terminal (10) is mounted in a housing containing said television set (20).

* * * * *